(12) United States Patent
Thompson et al.

(10) Patent No.: US 9,748,787 B2
(45) Date of Patent: Aug. 29, 2017

(54) INFORMATION HANDLING SYSTEM BATTERY CHARGE MANAGEMENT TO SUPPORT VARIABLE INCREASED CURRENT USE FUNCTIONS

(71) Applicant: Dell Products L.P., Round Rock, TX (US)

(72) Inventors: Richard C. Thompson, Cedar Park, TX (US); Andrew T. Sultenfuss, Leander, TX (US); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 73 days.

(21) Appl. No.: 14/795,446

(22) Filed: Jul. 9, 2015

(65) Prior Publication Data

US 2016/0294197 A1 Oct. 6, 2016

Related U.S. Application Data

(63) Continuation-in-part of application No. 14/676,965, filed on Apr. 2, 2015, now Pat. No. 9,507,400.

(51) Int. Cl.
*G06F 1/26* (2006.01)
*G06F 1/32* (2006.01)
*H02J 7/00* (2006.01)

(52) U.S. Cl.
CPC .............. *H02J 7/007* (2013.01); *G06F 1/263* (2013.01); *G06F 1/329* (2013.01); *G06F 1/3212* (2013.01); *H02J 7/0068* (2013.01)

(58) Field of Classification Search
CPC ........ G06F 1/263; G06F 1/3212; G06F 1/329; H02J 7/0068; H02J 7/007
See application file for complete search history.

(56) References Cited

U.S. PATENT DOCUMENTS

| | | | |
|---|---|---|---|
| 9,015,514 B2 | 4/2015 | Sultenfuss et al. | |
| 2012/0083258 A1* | 4/2012 | Rabii | H04W 52/0261 455/418 |
| 2013/0124126 A1* | 5/2013 | Ahuja | G01C 25/00 702/85 |
| 2014/0068310 A1* | 3/2014 | Sultenfuss | G06F 1/28 713/340 |

* cited by examiner

*Primary Examiner* — M Elamin
(74) *Attorney, Agent, or Firm* — Terrile, Cannatti, Chambers & Holland, LLP; Robert W. Holland (57) ABSTRACT

A portable information handling system manages battery charge to maintain a minimum level that supports boot by disconnecting the battery from a battery discharge path so that battery charge is lost substantially only to self-discharge. The battery automatically reconnects to the battery discharge path if external power becomes available to charge the battery. The minimum battery charge level provides adequate power in combination with the external power to support boot of the portable information handling system to an operational state. A power manager monitors power transition events to track power consumption information that a battery charge manager applies to modify the power transition events if external power and available battery charge are not sufficient to perform the power transition event without modification.

17 Claims, 5 Drawing Sheets

INFORMATION HANDLING SYSTEM BATTERY CHARGE MANAGEMENT TO SUPPORT VARIABLE INCREASED CURRENT USE FUNCTIONS

CONTINUING DATA

This application is a continuation-in-part of U.S. patent application Ser. No. 14/676,965, filed Apr. 2, 2015, now U.S. Pat. No. 9,507,400, entitled "Information Handling System Battery Charge Management to Support Quick Start," which includes exemplary systems and methods and is incorporated by reference, in its entirety.

BACKGROUND OF THE INVENTION

Field of the Invention

The present invention relates in general to the field of information handling system power management, and more particularly to an information handling system battery charge management to support variable increased current use functions.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems have shrunk in size as end users have sought mobile devices that provide convenient access to information on the go. One example of such portable information handling systems is the smart phone, which typically accesses information through both mobile telephone provider wireless wide area networks (WWAN) and wireless local area network (WLAN) hotspots. Mobile telephones generally support web browser and email applications so that end users can view data anywhere that WWAN or WLAN communication are available. However, mobile telephone devices tend to have small surface areas that include small displays so that reading lengthy documents tends to be inconvenient. Tablet information handling systems offer an alternative with greater surface area for larger displays and more convenient reading. Tablet information handling systems tend to have a form factor that is too large for use as a mobile telephone handset yet small enough to allow convenient mobility for the end user. Tablet information handling systems with 7, 9 or 10 inch screens generally have enough surface area for an end user to conveniently run book reading or web browsing applications.

In an effort to shrink the size of portable information handling systems, manufacturers have turned to planar housings with a display using the majority of a front surface area, and a touchscreen in the display that provides a keyboard. Generally, to keep the thickness of the planar housing to a minimum, portable information handling systems include thin lithium ion batteries that rest in the rear surface of the portable information handling system. Often, the lithium ion batteries are less-expensive "dumb" batteries that do not include microcontrollers to measure charge, discharge and other battery status indicators. Because of the limited size of portable information handling system housings, the flat batteries typically have smaller cell sizes so that battery life under heavy usage tends to be limited. Portable information handling systems tend to include aggressive power savings measures to manage battery charge life, such as automated screen dimming and relatively rapid power down into reduced power states when left unused.

Another reason for aggressively managing portable information handling system charge life is that re-charging of portable information handling system batteries is often performed with relatively low power charging devices. For instance, portable information handling systems often include only a single micro-USB connector that acts as both a synchronization tool to interact with external information handling systems and a charger that accepts a charge as defined by the USB interface specification. Although USB charging is convenient, the lower available rate of charge tends to increase charging time to bring a battery to a full charge.

One difficulty with lower charger capacities is that portable information handling systems generally must rely at times on both the charger and the battery to provide adequate power to run. For example, during system startup a current surge tends to occur as subsystems boot to life. In order to provide enough current to boot, a power manager typically draws power from both the battery and an external power source if one is available. If the battery charge is low during a cold start power-on event, then lack of battery assistance often means that the external USB power source will not have enough current to startup the portable information handling system. Generally, portable information handling system batteries must have 3% to 5% of the battery full charge state in order for the portable information handling system to boot. If a battery does not have this minimal charge reserve when the information handling system attempts to boot, the battery has to charge until the minimal charge reserve is available. As a result, if a portable information handling system battery has an inadequate charge, boot is delayed until the battery can charge to a point that supports boot. In some instances, end users are forced to wait minutes to hours before their portable information handling system will boot.

System boot is not the only power transition event that increases current draw above the external power adapter current supply limit. Other types of power state transitions can place a current burden on a system that temporarily exceeds external adapter current availability, often for variable amounts of time. For example, system updates, virus scans, streaming events, information technology "push" events, gaming application events or other display and/or processor heavy events can increase current draw with temporary spikes or even extended times. The extent of a current draw spike over the current supply capability of a system also varies depending on the system's hardware and software configurations, age and battery age. For instance, current draw may depend upon the types of physical components loaded on a particular system, such as the display type, the software image loaded on the system, the type and size of persistent and non-persistent memory (RAM, SSD or HDD), and the use of hardwired or wireless peripheral devices. As a result of the wide variance in current draw that can occur in various configurations and power transition events, even when operating in a steady state on external power, some portable information handling systems must maintain a battery reserve to ensure that adequate current remains available to draw at power up. This battery reserve is also available for other types of power transition events that exceed available external power, although the availability of adequate power reserve for other types of power transition events is generally fortuitous since amount of power consumed is variable and generally not tracked in conventional systems.

SUMMARY OF THE INVENTION

Therefore, a need has arisen for a system and method which provides portable information handling system battery charge management by tracking energy used for power state transitions with variable system requirements.

A further need exists for a system and method which provides portable information handling system battery charge management to support variable increased current use functions.

In accordance with the present invention, a system and method are provided which substantially reduce the disadvantages and problems associated with previous methods and systems for portable information handling system battery charge management. A switch physically disconnects a battery from a battery discharge path that powers information handling system components when the battery reaches a charge level associated with booting the information handling system. When connected to an external power source, the information handling system boots without delay for charging with the remaining charge of the battery sufficient to combine with external power and overcome surge current associated with boot.

A further system and method are provided which monitor power consumption information during power transition events to modify power use by the portable information handling system to stay within power constraints, such as not exceeding power available from a battery and external power source during a power transition event. Power consumption information monitored during power transition events is applied so that changes in hardware, firmware and/or software configuration that impact power use do not result in power consumption exceeding available power from combined battery and external power sources or just a battery source when external power is not connected.

More specifically, a tablet portable information handling system is built in a planar housing with a rechargeable battery to power processing components, such as central processing unit (CPU), random access memory (RAM), a solid state drive (SSD), a display and a wireless network interface card (WNIC). External power provided from an external power source, such as an AC-to-DC converter and USB adapter, also powers the processing components and uses extra power to recharge the battery. In boot, a power manager handles current surges associated with bringing components up to an operational state by using battery power in addition to external power when external power alone is not adequate. In order to ensure adequate battery charge to support a boot, a battery charge manager selectively disconnects the battery from the battery discharge path when the battery charge reaches a critical level, such as a level needed to support boot of the portable information handling system on external power. The battery charge manager automatically reconnects the battery with the battery discharge path when external power is available so that the battery recharges and is available to support a start with the external power source.

As another example, power consumption information is monitored by a power manager during defined power transition events, such as boot, system updates, virus scans, video streaming, gaming, etc. Monitoring and storing power consumption information in association with power transition events provides a battery charge manager to update power consumption use as the portable information handling system configuration changes, such as due to hardware, firmware and/or software modifications made by the user over time. During normal operations, if a power transition event is detected, the battery charge manager applies power consumption information to determine if external power and available battery power are sufficient to perform a power transition event. If not, then the battery charge manager modifies information handling system operations to maintain power use within available constraints, such as by delaying the power transition event, throttling the system processor, modifying the power transition event or modifying other operations at the portable information handling system.

The present invention provides a number of important technical advantages. One example of an important technical advantage is that a portable information handling system will start on an external charger in a rapid manner. A battery charge manager monitors battery charge conditions and breaks the battery discharge path above a critical battery charge level. Once the battery discharge path is broken, system charge leakage paths are eliminated so than only battery cell self-discharge reduces the battery charge. By defining the minimum battery charge as an amount greater than that required to start a portable information handling system with a charger attached, the end user is assured of a rapid startup without delays induced to build a battery charge. The amount of "reserve" battery charge for startup is adjusted as system parameters and battery parameters change so that battery charge life is minimally impacted.

Another example of an important technical advantage is that a variety of power transition events are monitored over time to track changes in power consumption at the portable information handling system, such as may arise due to hardware, software and/or firmware configuration changes. If a power transition event is detected, the portable information handling system compares available external and battery power with monitored power consumption information to determine if adequate power is available to perform the power transition event. Thus, the portable information handling system has up-to-date power consumption information to determine whether a power transition event can complete if initiated. If inadequate power is present, then the power transition event is modified to avoid inducing a system shutdown before completion of the power transition event. End users experience less disruption when power transition events are modified than when an information handling system fails due to insufficient power. If battery power is not sufficient to complete the power state transition, either directly or with modification, the user may be provided with notice, such as a message or beep, to indicate the reason for system inaction. Further, by actively monitoring and storing real power use information at a portable information handling system, more precise power management is available to help maximize the amount of battery available to an end user.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Disconnecting a battery from a discharge path that powers an information handling system ensures adequate reserve charge in the battery to provide rapid boot for the information handling system when external power becomes available. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
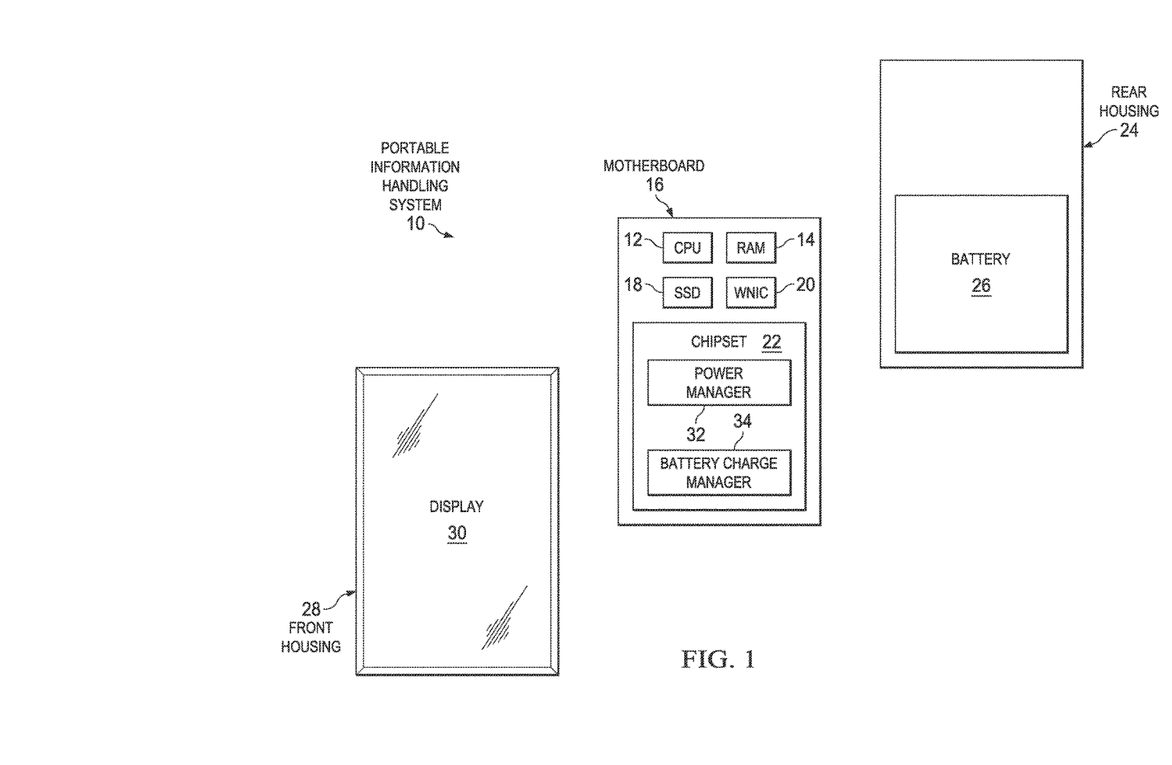
FIG. 1 depicts a blowup view of a tablet portable information handling system having a battery charge reserve to support a quick start.

Referring now to FIG. 1, a blowup view depicts a tablet portable information handling system 10 having a battery charge reserve to support a quick start. Portable information handling system 10 processes information with a central processing unit (CPU) 12 that executes instructions in cooperation with a random access memory (RAM) 14 communicating through a motherboard 16. A solid state drive (SSD) 18 or other persistent memory stores an operating system and applications for execution by CPU 12. A wireless network interface card (WNIC) 20 supports wireless communication with external devices, such as through Bluetooth, wireless local area network (WLAN) and wireless wide area network (WWAN) communications. A chipset 22 includes various processing components and firmware that manage boot of portable information handling system 10 and cooperation between physical processing components, such as to accept inputs and present outputs with a basic input/output system (BIOS). Motherboard 16 is supported in a planar housing between a rear housing 24 that supports a battery 26 and a front housing 28 that supports a display 30. End user's view information generated by CPU 12 as visual images at display 30 and make inputs to CPU 12 with a touchscreen disposed in display 30. Chipset 22 includes a graphics processor that generates visual images and an embedded controller, also known as a keyboard controller, that accepts inputs.

During normal operations, a power manager 32 powers components to support information processing. Power manage 32 provides power to the components from battery 26 and from an external power source if connected, such as an AC-to-DC converter. For example, power manager 32 is firmware code distributed between an embedded controller and battery charger of chipset 22. Since external power sources for tablet portable information handling system 10 sometimes have limited current, power manager 32 manages external power when available in order to meet processing component current demands and recharge battery 26. For instance, if processing component current demand is less than current available from an external power source, then power manager 32 uses excess power to charge battery 26. If a processing task imposes a current demand that is greater than current available from an external power source, then power manager provides the extra needed current by drawing down the charge of battery 26. One example of a situation that draws power from both external power and battery 26 is boot of portable information handling system 10. During boot, multiple processing components are brought to an operational state at the same time so that current draw tends to peak above current available from some AC-to-DC power converters, such as USB-type power supplies. If current demand exceeds available external power and battery power, then boot will fail or will be delayed for a time period while the battery charges to the level required for supplementing the external power supply during boot.

A battery charge manager 34 cooperates with power manager 32 to ensure that adequate current is available for boot of portable information handling system 10. Battery charge manager 34 monitors available battery charge and prohibits boot unless the available battery charge plus the available external power are adequate to bring portable information handling system 10 to an operational state. For example, battery charge manager 34 will require that external power charge battery 26 to a minimum charge state, such as 3 to 5%, before allowing a boot to initiate. If battery 26 is below the minimum charge state when an end user attempts to initiate a boot, the end user experiences a delay during which time battery 26 accepts a charge to get to the minimum charge state.

To prevent the need for charging battery 26 when a boot is initiated, battery charge manager 34 monitors the battery charge state and, at or before the minimum charge state, physically disconnects the battery from powering the processing components so that substantially only battery self-discharge reduces battery reserve charge. With the battery holding at least the minimum charge state in reserve, battery charge manager 34 is able to immediately initiate boot of information handling system 10 as soon as external power is connected by physically re-connecting the battery to power the processing components. Breaking the battery discharge path above the critical charge level need for reboot initiates an immediate power shutdown of information handling system 10, so battery charge manage 34 issues a warning to the end user as the critical battery charge is approached to allow the end user time to connect external power or to shut the system down normally. With the battery discharge path disconnected, all system leakage paths are shutdown so that only battery self-discharge will reduce the battery charge state. Connecting external power allows battery charge manager 34 to immediately reconnect the battery discharge path so that the battery is able to accept a charge. For example, a field effect transistor (FET) managed by an embedded controller is automatically closed to connect battery 26 with external power whenever external power becomes available. Once external power is available, the embedded controller has power to execute battery charge manager 34, to confirm that battery 26 has the minimum charge state, and to initiate boot.

In one embodiment, battery charge manager 34 has a minimum charge state fixed in memory and programmed to cause disconnect of the battery from power the information handling system when external power is not available. In alternative embodiments, the minimum charge state adapts to program usage so that the battery charge is available as much as possible without impacting the reserve charge needed to support system boot. For example, battery charge manager 34 may increase the minimum charge state if, over time, an end user applies external power that has less current than expected so that greater amounts of battery current is needed to support boot. As another example, battery charge manager 34 may decrease or even eliminate the minimum charge state if, over time, an end user applies external power that has greater than expected current. For instance, battery charge manager 34 monitors charging current to track the smallest available current over a defined historical time frame and uses that charging current to set the minimum battery charge state. Alternatively, battery charge manager 34 tracks charge current available at different locations, such as work and home determined by GPS or network identifiers, and sets the minimum battery charge state based upon the next location at which the end user is expected to start the information handling system.

In one alternative embodiment, battery charge manager 34 monitors current usage during boot over a historical time frame and applies the boot current usage to determine the minimum battery charge state. For example, boot current may increase when added components or added functionality is brought to an operational state. Similarly, boot current may decrease when removed or changed components or functionality change power consumption characteristics. Indeed, peak boot current may change if a boot sequence is altered to start components or processes sequentially instead of simultaneously. By tracking the maximum boot current experienced over a historical time frame, battery charge manager 34 adapts the minimum charge level to expected current draw at boot so that end users have as much of an available battery charge allowed for use.

In another alternative embodiment, battery charge manager 34 adapts the minimum battery charge level based upon battery characteristics. For example, battery charge manager 34 will increase reserve battery charge as a battery ages to help compensate for increased self-discharge rates. Battery characteristics may be determined by tracking dates of battery changes or tracking impedance of the battery. Other types of battery performance characteristics may be tracked to adjust the minimum battery charge, such as average operating temperature, etc.

Figure 2:
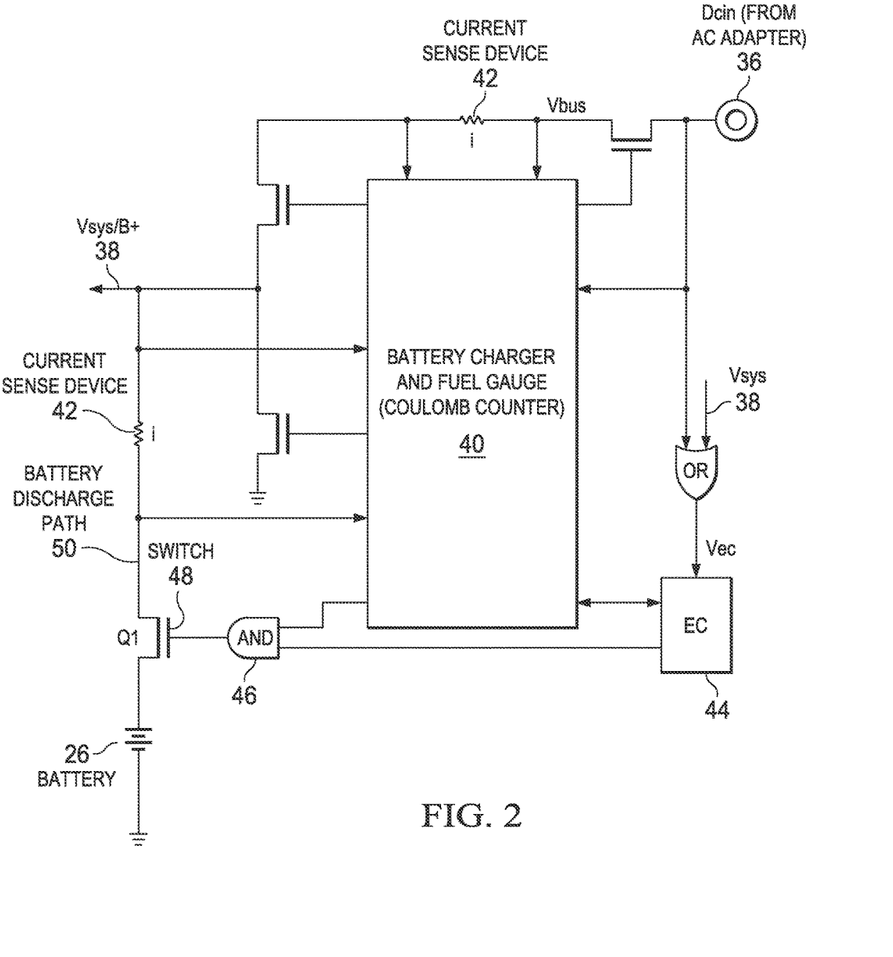
FIG. 2 depicts an electrical circuit block diagram of a portable information handling system power subsystem that disconnects a battery from a battery discharge path upon reaching a critical battery charge level associated with quick start of the portable information handling system.

Referring now to FIG. 2, an electrical circuit block diagram depicts a portable information handling system power subsystem that disconnects a battery 26 from a battery discharge path 50 upon reaching a critical battery charge level associated with quick start of the portable information handling system. In the example embodiment, external power is provided through DCin 36 from an external power adapter to provide power to system components through a Vbus and then Vsys bus 38. A battery charger and fuel gauge 40 manages external power to power Vsys 38 and to send extra power to recharge battery 26 by monitoring power consumption with current sense devices 42, such as sense resistors. An embedded controller 44 cooperates with battery charger 40 to manage power, such as with a power manager 32 supported in embedded code distributed between embedded controller 44 and battery charger 40. When the information handling system is shutdown, embedded controller 44 is able to run using power from Vsys 38 or with power provided directly from the external power source through DCin 36.

Battery charger 40 and embedded controller 44 control an "and" gate 46 that opens and closes a switch 48, such as an FET. Switch 48 opens to disconnect battery 26 from battery discharge path 50 and closes to connect battery 26 with battery discharge path 50. When switch 48 opens to disconnect battery 26 from battery discharge path 50, charge in battery 26 is lost substantially only to self-discharge. Embedded controller 44 and battery charger 40 disconnect battery 26 from battery discharge path 50 if external power is not detected and the charge in battery 26 falls to a threshold, such as a minimum charge level needed for system boot. Embedded controller 44 and battery charger 40 reconnect battery 26 anytime external power is detected as available to allow a system boot. If battery discharge path 50 is disconnected, embedded controller 44 will power up when external power is connected to manage to battery charge and system boot so that adequate power is available to boot the system before boot is initiated.

Figure 3:
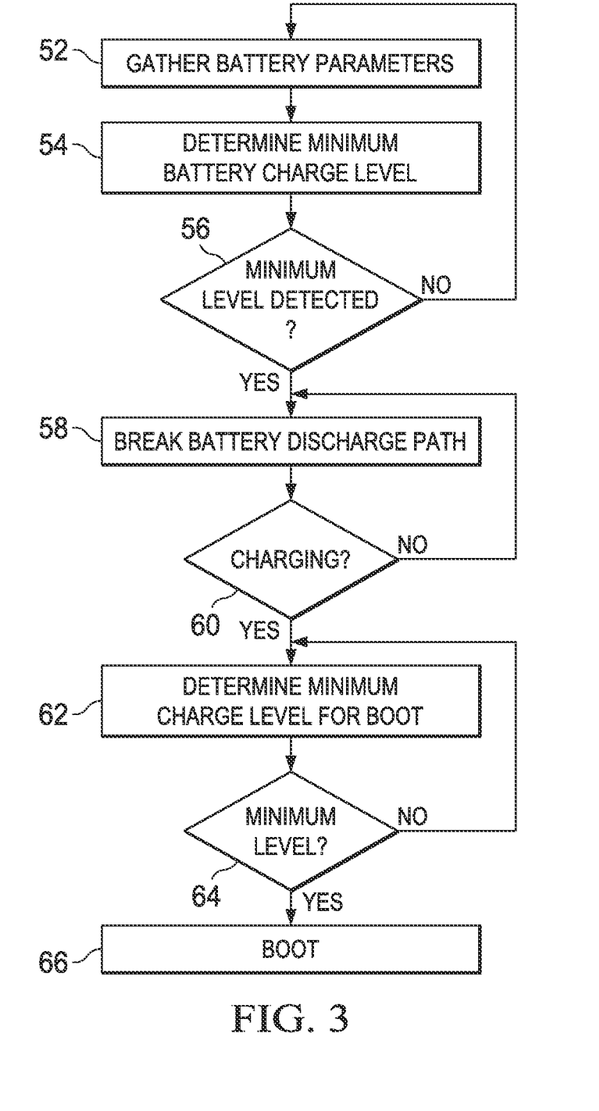
FIG. 3 depicts a flow diagram of a process for disconnecting a battery from a discharge path with adequate power to support a boot of a portable information handling system with the battery providing power in cooperation with an external power source.

Referring now to FIG. 3, a flow diagram depicts a process for disconnecting a battery from a discharge path with adequate power to support a boot of a portable information handling system with the battery providing power in cooperation with an external power source. The process starts at step 52 with a gathering of battery parameters, such as a minimum charge level setting or information needed to determine the minimum charge level setting as set forth above. At step 54, the minimum battery charge level is determined and monitoring for the minimum battery charge level is initiated. At step 56, a determination is made as to whether the minimum battery charge level is reached and, if not, the process returns to step 52. If the minimum battery charge level is reached, the process continues to step 58 to break the battery discharge path so that substantially only battery self-discharge reduces the battery charge.

After the battery disconnects from the system the process continues to step 60 to determine if the system has started charging. For example, charging is detected if the embedded controller powers up with power provided from an external power source. If no charging is detected the process returns to step 58 to continue with the battery disconnected. Once charging is detected, the process continues to step 62 to determine that a minimum charge level is available for boot. In one embodiment, a slight delay is made to allow charging to make up for self-discharge. Alternatively the battery charger may test the battery to ensure adequate current is available, although in many cases batteries on small portable tablet information handling systems do not include battery management units (BMU) or other intelligence that actively tracks battery charge. If the minimum charge level is not present, the process returns to step 62. If the minimum charge level is present, the process continues to step 66 to allow boot.

Figure 4:
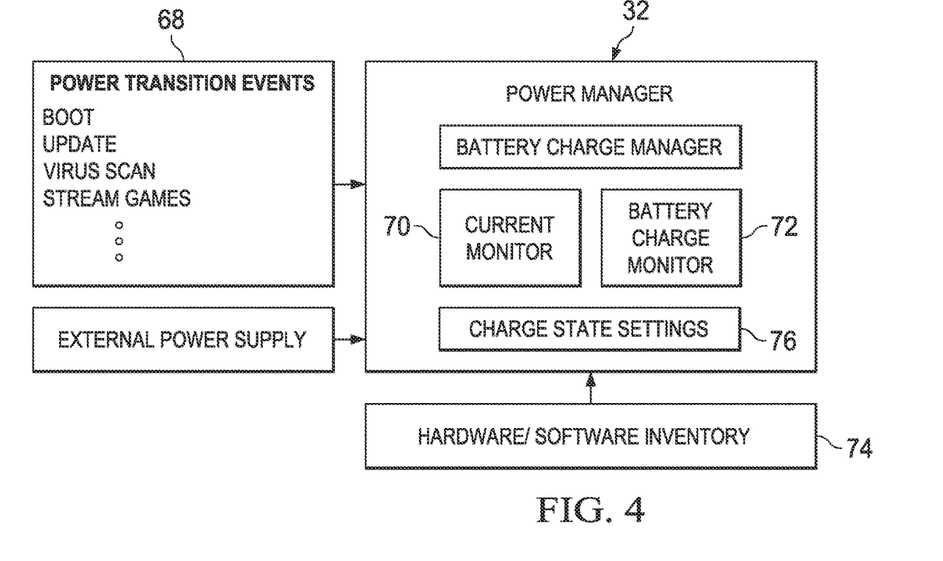
FIG. 4 depicts a block diagram of a system that manages battery charge levels to support variable increased current use functions.

Referring now to FIG. 4, a block diagram depicts a system that manages battery charge levels to support variable increased current use functions. Power manager 32 is, for example, a firmware module stored in an embedded controller's persistent memory that executes to manage power consumption at a portable information handling system as described above. A battery charge manager 34 interfaced with or integrated in power manager 32 manages access to a battery for storing power provided from an external power supply and obtaining power to run portable information handling system processing components when external power is not available. Power manager 32 retrieves a list of power transition events 68 from an operating system or other source and references the list to initiate monitoring of power consumption use associated with the power transition events. For example, power manager 32 references power transition events list 68 to initiate power consumption monitoring if a boot request is detected at an embedded controller or a video stream is initiated at a graphics subsystem interface with the embedded controller. Alternatively, power manager 32 receives power transition event notifications from an operating system when the operating system initiates a system update, virus scan, or high-power-use application such as gaming applications. In response to a power transition event notification, power manager 32 monitors power consumption and stores power consumption use information until the operating system sends a notification that the power transition event has completed. In alternative embodiments, alternative types of power transition events may be monitored as appropriate. For example, lower-power-use applications may be monitored so that power management is provided for combinations of different functions executing at the portable information handling system.

Power manager 32 monitors power consumption with various tools available through the system firmware, such as BIOS current and battery capacity registers. For example, a current monitor 70 reads and stores the maximum current provided by the power manager to the processing components during the power transition event. As another example, a battery charge monitor measures the battery charge state before and after a power transition event to determine the amount of battery charge used to complete the power transition event. Power manager 32 references the system configuration available from a hardware/software inventory 74 to analyze the current and battery measurements, then stores power consumption information associated with the power transition event in charge state settings 76. For example, the current use of a power transition event is found from current monitor 70, normalized for the system configuration and then saved as a battery charge level needed to perform the power transition event when external power is available. Similarly, the battery charge state before and after a power transition event is normalized for system configuration and saved as a minimum battery state needed in order to let the power transition event proceed when external power is available.

Upon detecting a request for a power transition event, power manager 32 retrieves charge state settings 76 and compares the battery charge state with the minimum charge state needed to complete the power transition event. If the charge state is not sufficient to complete the power transition event, power manager 32 modifies the power transition event, such as by delaying initiation of the power transition event until adequate battery charge is available, modifying the power transition event so that it uses less power, and/or modifying system operations to use less power so that the power transition event can proceed. One example of power transition event modifications relate to system boot. For example, if external power and battery charge are insufficient to complete system boot based on the three most recent stored power consumption information in charge state settings 76, boot may be delayed until more battery charge is available. Alternatively, boot may be initiated in an alternative sequence that has a reduced peak current draw, such as by sequentially powering processing components like WiFi, display and audio components rather than applying power to all components at system power up. Another example of power transition modification is delaying presentation of streaming at a display until the battery has sufficient charge or reducing power needed for streaming by modifying the streaming to process at a lower display resolution. Another example of power transition modification is throttling the information handling system processing to reduce peak current draw below a level that the available battery charge can support. For instance, at a very slight battery charge state with external power available, heavy throttling may be used to limit current draw to a maximum of just over the current available from an external power source; versus at a more moderate battery charge state, less throttling may be used since the battery can provide greater current peaks without overdrawing its charge store.

By logging and storing power consumption information in an ongoing basis, power manager 32 accounts for power use profiling as system configuration changes and a battery ages. In addition, real time monitoring associated with detected physical locations, such as GPS or WLAN locations, adapts power transition events for environmental conditions, such as temperature or predicted workload. Power consumption logging is triggered by power transition events and continue through peak power transition use to a continuous state use, such as initiation of an application until presentation of a productivity screen by an operating system, user inputs at the application with a mouse, touchscreen or keyboard, or storage device idle state. Power transition states have peak current demands that exceed steady state demands and, generally for purposes of the present application, exceed the power available from an external power source so that current is provided from a battery to supplement the external power source. In one embodiment, power transition events are identified by monitoring for draw from a battery to supply current when an external power source is available. Since current is provided from the battery during the power transition event, power manager 32 ensures that an adequate battery charge is available before allowing the power transition event to initiate unmodified. Although power manager 32 is depicted as a firmware module included in an embedded controller, in alternative embodiments, logging and monitoring of power transition events may be performed in whole or in part by a battery, the host system's various processing components, the operating system or various combinations of all. Logged current, battery charge and power use values may be system specific and even configuration specific within a system, with logging initiated and repeated as various configurations are detected, such as at configuration changes, updates of software, or new hardware additions. Minimum charge states to initiate a power transition event may depend on whether a battery alone is powering the system or a battery in combination with an external power source. For each power state, events may proceed unmodified, proceed modified or delay based upon recent power consumption monitoring results. In one embodiment, certain events are prioritized to complete while other events are slept, postponed or shutoff.

Figure 5:
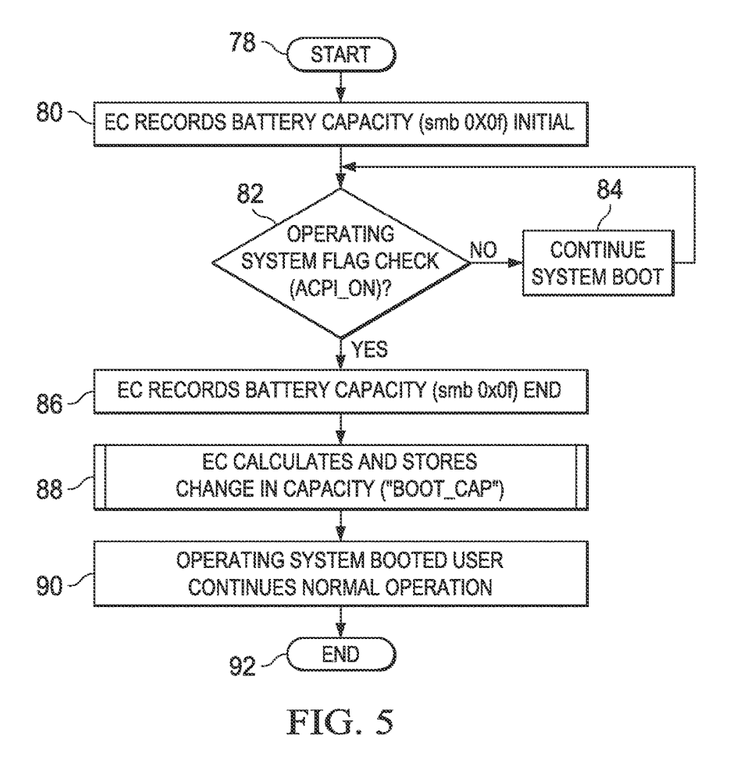
FIG. 5 depicts a flow diagram of one example embodiment of monitoring power consumption use during a boot power transition event.

Referring now to FIG. 5, a flow diagram depicts one example embodiment of monitoring power consumption use during a boot power transition event. The process starts at step 78, such as with selection of a power button to start boot. At step 80, the embedded controller records battery capacity at boot initiation, such as reading an SMB register that stores battery charge state. At step 82 an operating system flag check is performed to determine if boot is complete. If boot is not complete the process continues to step 84 to continue monitoring for boot completion. If boot complete is indicated by the operating system flag at step 82, the process continues to step 86 for the embedded controller to record battery capacity at completion of boot. At step 88, the embedded controller calculates and stores the change in battery capacity that resulted from the boot completion. The change in battery capacity may be stored separately for boots that take place without external power and with external power, or both types of boots may be normalized to indicate a common battery capacity, such as by discarding the power provided from external power for boots that take place with external power. At step 90, the operating system in a booted state is provided to the user for normal operations and the process ends at step 92. Although FIG. 5 depicts power monitoring for a boot power transition event, other types of power transition events may be similarly monitored based on changes in battery capacity. Alternatively, peak current use may be monitored during the power transition event instead of change in battery capacity.

Figure 6:
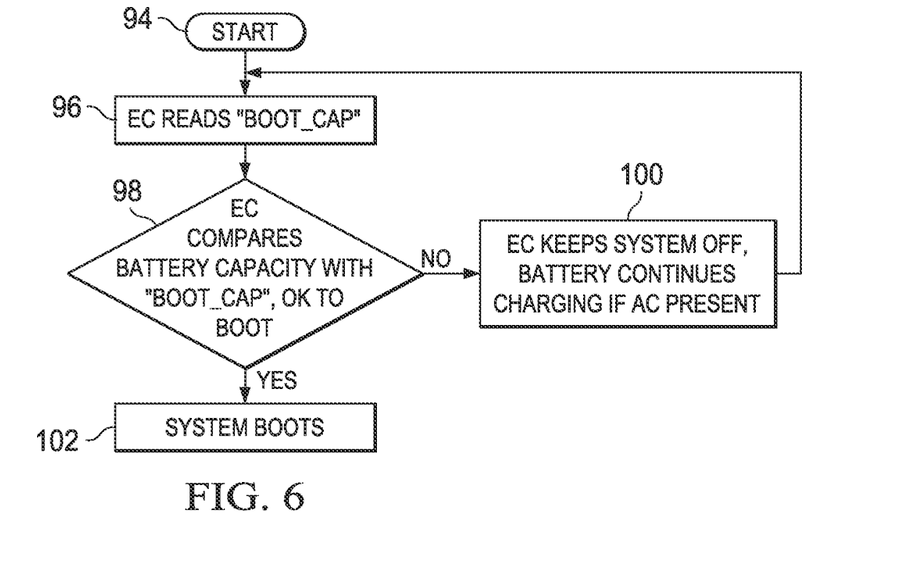
FIG. 6 depicts a flow diagram of one example embodiment of validating available power based on monitored power consumption use associated with a boot power transition event.

Referring now to FIG. 6, a flow diagram depicts one example embodiment of validating available power based on monitored power consumption use associated with a boot power transition event. The process starts at step 94 with detection of a power transition event, such as a boot request. At step 96, the embedded controller reads the battery capacity needed for the power transition event from persistent memory. At step 98, the embedded controller compares the existing battery capacity with the required battery capacity for completing the power transition event to determine if adequate battery capacity is available to perform the power transition event unmodified. If the battery charge state is not adequate, the process continues to step 100 where the embedded controller modifies the power transition event, such as by delaying boot until adequate charge is available in the battery to support boot. At step 98, if adequate battery charge is available, the process continues to step 102 to continue the power transition event, such as system boot. Although FIG. 6 depicts monitoring of battery charge for boot, in alternative embodiments, alternative types of power transition events may be monitored with alternative modifications as described above.

Although FIGS. 5 and 6 depict monitoring of power use during boot to better manage a boot power transition event, as set forth above, similar steps are provided to monitor power use during other types of power transition events so that battery power meets power demands with and without external power connected. The power use monitoring provides enhanced performance for smaller devices, such as smartphones and tablets that have "dumb" batteries, and also improves power availability in larger devices that have either dumb batteries or "smart" batteries that include battery management units (BMUs). For example, after boot is complete initiation of an application that streams video will cause power use monitoring to start so that a record of the power use in a video stream transition event is recorded. The power use may be based upon changes in battery capacity measured before and after start of video streaming, based upon peak current measured as drawn from the battery, based upon power drawn from a battery as measured by a BMU or based upon power drawn measured by a graphics chip that prepares the streaming video. Where multiple capabilities exist for power use measurements of different power transition events, the multiple power use measurements may be tracked to provide granular control for allocating battery power to handle the power transition event. For instance, initiation by a user of multiple heavy power use applications while operating on battery allows granular control of battery management based upon historical power use so that application execution is modified to sequence heavy power use transitions through processing resources while sleeping other heavy power use applications or operations. In this manner, all applications reach a steady operational state on minimal available current without substantially disrupting the end user's experience.

Although the present invention has been described in detail, it should be understood that various changes, substitutions and alterations can be made hereto without departing from the spirit and scope of the invention as defined by the appended claims.

What is claimed is:

1. A portable information handling system comprising:
a planar housing;
a processor disposed in the planar housing and operable to execute instructions to process information;
a memory disposed in the planar housing and interfaced with the processor, the memory operable to store the information;
a display disposed in the planar housing and interfaced with the processor and memory, the display operable to present the information as visual images;
a battery disposed in the housing and operable to power the processor, memory and display;
an external power supply operable to power the processor, memory and display, and to charge the battery;
a chipset having one or more processing components and non-transitory memory;
a power manager stored in the non-transitory memory and operable to execute on the one or more processing components to manage power applied by the battery and external power supply for powering the processor, memory and display, the power manager further operable to monitor power transition events that exceed power available from the external power supply and to store power consumption information associated with the monitored power transition events; and
a battery charge manager stored in the non-transitory memory and operable to execute on the one or more processing components, the battery charge manager interfaced with the power manager, the battery charge manager operable to apply the power consumption information to modify power manager power application at detection of one of the power transition events and a predetermined condition;
wherein the power transition event comprises a boot of an operating system on the processor to an operational state, the predetermined condition comprises a battery charge of less than a predetermined amount, and the modified power manager application comprises scheduling boot over an increased time period.

2. A portable information handling system comprising:
a planar housing;
a processor disposed in the planar housing and operable to execute instructions to process information;
a memory disposed in the planar housing and interfaced with the processor, the memory operable to store the information;
a display disposed in the planar housing and interfaced with the processor and memory, the display operable to present the information as visual images;
a battery disposed in the housing and operable to power the processor, memory and display;
an external power supply operable to power the processor, memory and display, and to charge the battery;
a chipset having one or more processing components and non-transitory memory;
a power manager stored in the non-transitory memory and operable to execute on the one or more processing components to manage power applied by the battery and external power supply for powering the processor, memory and display, the power manager further operable to monitor power transition events that exceed power available from the external power supply and to store power consumption information associated with the monitored power transition events; and
a battery charge manager stored in the non-transitory memory and operable to execute on the one or more processing components, the battery charge manager interfaced with the power manager, the battery charge manager operable to apply the power consumption information to modify power manager power application at detection of one of the power transition events and a predetermined condition;
wherein the power transition event comprises a virus scan, the predetermined condition comprises a battery charge of less than a predetermined amount, and the modified power manager application comprises throttling the processor.

3. A portable information handling system comprising:
a planar housing;
a processor disposed in the planar housing and operable to execute instructions to process information;
a memory disposed in the planar housing and interfaced with the processor, the memory operable to store the information;
a display disposed in the planar housing and interfaced with the processor and memory, the display operable to present the information as visual images;
a battery disposed in the housing and operable to power the processor, memory and display;
an external power supply operable to power the processor, memory and display, and to charge the battery;
a chipset having one or more processing components and non-transitory memory;
a power manager stored in the non-transitory memory and operable to execute on the one or more processing components to manage power applied by the battery and external power supply for powering the processor, memory and display, the power manager further operable to monitor power transition events that exceed power available from the external power supply and to store power consumption information associated with the monitored power transition events; and
a battery charge manager stored in the non-transitory memory and operable to execute on the one or more processing components, the battery charge manager interfaced with the power manager, the battery charge manager operable to apply the power consumption information to modify power manager power application at detection of one of the power transition events and a predetermined condition;
wherein the power transition event comprises streaming a video, the predetermined condition comprises a battery charge of less than a predetermined amount, and the modified power manager application comprises reducing the resolution of the images presented at the display.

4. A portable information handling system comprising:
a planar housing;
a processor disposed in the planar housing and operable to execute instructions to process information;
a memory disposed in the planar housing and interfaced with the processor, the memory operable to store the information;
a display disposed in the planar housing and interfaced with the processor and memory, the display operable to present the information as visual images;
a battery disposed in the housing and operable to power the processor, memory and display;
an external power supply operable to power the processor, memory and display, and to charge the battery;
a chipset having one or more processing components and non-transitory memory;
a power manager stored in the non-transitory memory and operable to execute on the one or more processing components to manage power applied by the battery and external power supply for powering the processor, memory and display, the power manager further operable to monitor power transition events that exceed power available from the external power supply and to store power consumption information associated with the monitored power transition events; and
a battery charge manager stored in the non-transitory memory and operable to execute on the one or more processing components, the battery charge manager interfaced with the power manager, the battery charge manager operable to apply the power consumption information to modify power manager power application at detection of one of the power transition events and a predetermined condition;
wherein the power transition event comprises an application associated with power use in excess of power available from the external charger, the predetermined condition comprises a battery charge of less than a predetermined amount and the modified power manager application comprises postponing the power transition event.

5. A portable information handling system comprising:
a planar housing;
a processor disposed in the planar housing and operable to execute instructions to process information;

a memory disposed in the planar housing and interfaced with the processor, the memory operable to store the information;

a display disposed in the planar housing and interfaced with the processor and memory, the display operable to present the information as visual images;

a battery disposed in the housing and operable to power the processor, memory and display;

an external power supply operable to power the processor, memory and display, and to charge the battery;

a chipset having one or more processing components and non-transitory memory;

a power manager stored in the non-transitory memory and operable to execute on the one or more processing components to manage power applied by the battery and external power supply for powering the processor, memory and display, the power manager further operable to monitor power transition events that exceed power available from the external power supply and to store power consumption information associated with the monitored power transition events; and a battery charge manager stored in the non-transitory memory and operable to execute on the one or more processing components, the battery charge manager interfaced with the power manager, the battery charge manager operable to apply the power consumption information to modify power manager power application at detection of one of the power transition events and a predetermined condition;

wherein the power manager monitors power transition events identified in a list stored in persistent memory as associated with increased current use, the power manager monitoring current draw during the power transition events.

6. A portable information handling system comprising:

a planar housing;

a processor disposed in the planar housing and operable to execute instructions to process information;

a memory disposed in the planar housing and interfaced with the processor, the memory operable to store the information;

a display disposed in the planar housing and interfaced with the processor and memory, the display operable to present the information as visual images;

a battery disposed in the housing and operable to power the processor, memory and display;

an external power supply operable to power the processor, memory and display, and to charge the battery;

a chipset having one or more processing components and non-transitory memory;

a power manager stored in the non-transitory memory and operable to execute on the one or more processing components to manage power applied by the battery and external power supply for powering the processor, memory and display, the power manager further operable to monitor power transition events that exceed power available from the external power supply and to store power consumption information associated with the monitored power transition events; and a battery charge manager stored in the non-transitory memory and operable to execute on the one or more processing components, the battery charge manager interfaced with the power manager, the battery charge manager operable to apply the power consumption information to modify power manager power application at detection of one of the power transition events and a predetermined condition;

wherein the power manager monitors power transition events identified in a list stored in persistent memory, the power manager monitoring battery capacity used during the power transition events.

7. A portable information handling system comprising:

a planar housing;

a processor disposed in the planar housing and operable to execute instructions to process information;

a memory disposed in the planar housing and interfaced with the processor, the memory operable to store the information;

a display disposed in the planar housing and interfaced with the processor and memory, the display operable to present the information as visual images;

a battery disposed in the housing and operable to power the processor, memory and display;

an external power supply operable to power the processor, memory and display, and to charge the battery;

a chipset having one or more processing components and non-transitory memory;

a power manager stored in the non-transitory memory and operable to execute on the one or more processing components to manage power applied by the battery and external power supply for powering the processor, memory and display, the power manager further operable to monitor power transition events that exceed power available from the external power supply and to store power consumption information associated with the monitored power transition events; and a battery charge manager stored in the non-transitory memory and operable to execute on the one or more processing components, the battery charge manager interfaced with the power manager, the battery charge manager operable to apply the power consumption information to modify power manager power application at detection of one of the power transition events and a predetermined condition;

wherein the power manager is further operable to detect a configuration change and in response to increase power transition events to capture power consumption changes associated with the configuration change.

8. A method for managing power at a portable information handling system, the method comprising:

detecting at the portable information handling system a power transition event with a processor integrated in the portable information handling system, the power transition event comprising a boot of the portable information handling system;

storing with the processor into non-transitory memory power consumption information associated with the power transition event; and applying the power consumption information at the processor to modify application of power at subsequent detection of the power transition event by the processor and a predetermined condition, the predetermined condition comprising external power available at a boot of the information handling system and a battery charge of a predetermined amount.

9. The method of claim 8 wherein the modified application of power comprises a modified boot having a reduced maximum current draw.

10. The method of claim 8 wherein the modified application of power comprises a delayed boot for a time adequate to recharge the battery so that the battery provides current sufficient in the boot to meet that indicated as needed by the power consumption information.

11. The method of claim 8 wherein storing power consumption information associated with the power transition event comprises comparing the battery charge at a start of the power transition event with the battery charge at the end of the power transition event.

12. A method for managing power at a portable information handling system, the method comprising:
- detecting at the portable information handling system a power transition event with a processor integrated in the portable information handling system;
- storing with the processor into non-transitory memory power consumption information associated with the power transition event; and
- applying the power consumption information at the processor to modify application of power at subsequent detection of the power transition event by the processor and a predetermined condition;
- wherein:
- the power transition event comprises presenting streaming video at the portable information handling system; and
- the predetermined condition comprises external power available at initiation of the streaming video and a battery charge of a predetermined amount.

13. The method of claim 12 wherein storing power consumption information associated with the power transition event comprises determining a maximum current draw during the power transition event.

14. The method of claim 13 wherein the modified application of power comprises a reduced display resolution for presenting the streaming video, the reduced display resolution having reduced current draw to maintain information handling system current draw within a constraint.

15. A method for managing power at a portable information handling system, the method comprising:
- detecting at the portable information handling system a power transition event with a processor integrated in the portable information handling system;
- storing with the processor into non-transitory memory power consumption information associated with the power transition event; and
- applying the power consumption information at the processor to modify application of power at subsequent detection of the power transition event by the processor and a predetermined condition;
- wherein:
- the power transition event comprises a virus scan of the portable information handling system; and
- the predetermined condition comprises external power available at initiation of the virus scan and a battery charge of a predetermined amount, the modified application of power including at least a throttling of the portable information handling system processor.

16. A system for managing power at a portable information handling system, the system comprising:
- a power manager stored in non-transitory memory and operable to execute on a processor to manage power applied by a battery and an external power supply for powering the portable information handling system, the power manager further operable to monitor power transition events that exceed power available from the external power supply and to store power consumption information associated with the monitored power transition events; and
- a battery charge manager stored in non-transitory memory and operable to execute on a processor, the battery charge manager interfaced with the power manager, the battery charge manager operable to apply the power consumption information to modify power manager power application at detection of one of the power transition events and less than a predetermined battery charge based upon the power consumption information;
- wherein the power consumption information comprises a battery charge at the start of the power transition event and a battery charge at completion of the power transition event.

17. A system for managing power at a portable information handling system, the system comprising:
- a power manager stored in non-transitory memory and operable to execute on a processor to manage power applied by a battery and an external power supply for powering the portable information handling system, the power manager further operable to monitor power transition events that exceed power available from the external power supply and to store power consumption information associated with the monitored power transition events; and
- a battery charge manager stored in non-transitory memory and operable to execute on a processor, the battery charge manager interfaced with the power manager, the battery charge manager operable to apply the power consumption information to modify power manager power application at detection of one of the power transition events and less than a predetermined battery charge based upon the power consumption information;
- wherein the power consumption information comprises a maximum current draw during the power transition event.

* * * * *